Feb. 24, 1970  J. P. VAN KLEUNEN  3,497,054
BARGE UNLOADING SYSTEM

Filed Sept. 5, 1967  2 Sheets-Sheet 1

INVENTOR.
Jack P. Van Kleunen
BY
John L. Shortley
ATTORNEY

Feb. 24, 1970
J. P. VAN KLEUNEN
3,497,054
BARGE UNLOADING SYSTEM
Filed Sept. 5, 1967
2 Sheets-Sheet 2
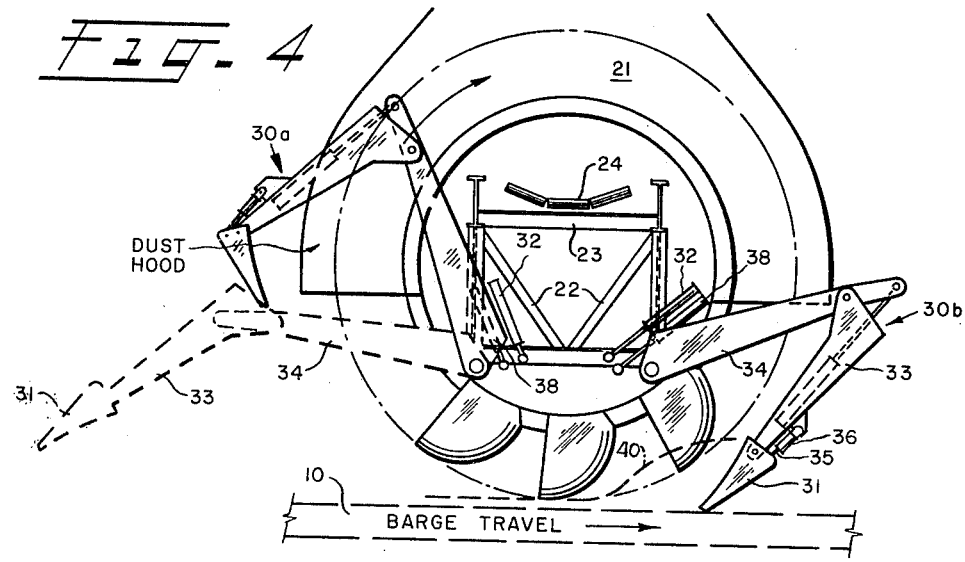
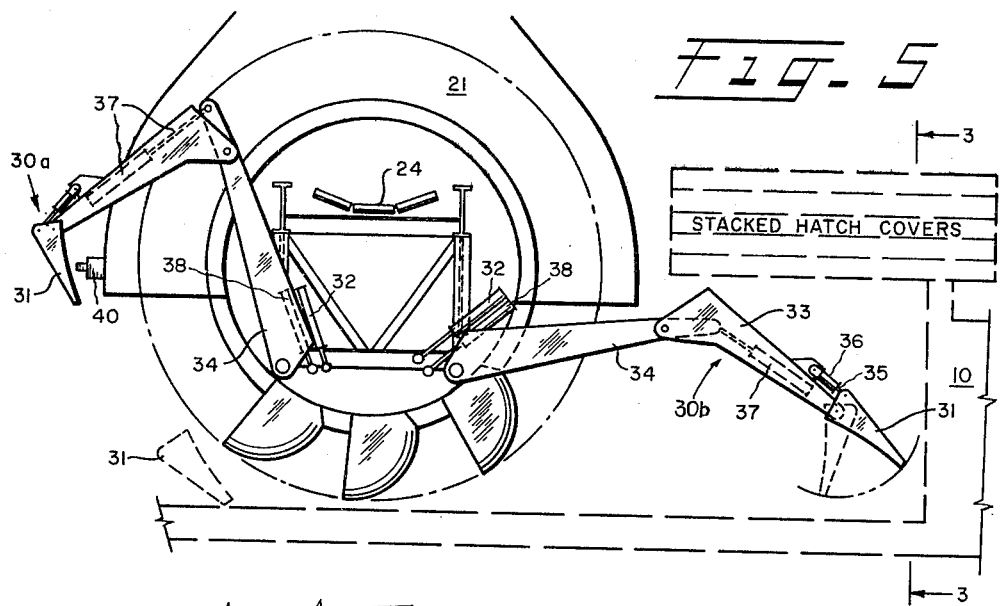
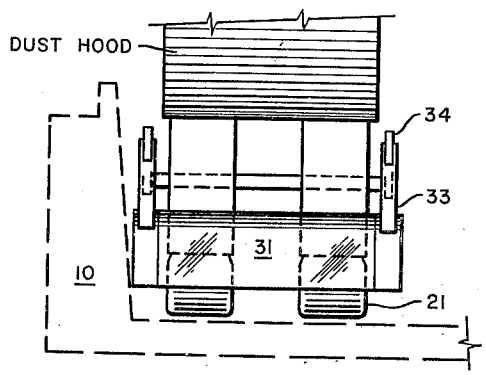
INVENTOR.
Jack P. Van Kleunen
BY
John L. Shortley
ATTORNEY United States Patent Office 3,497,054
Patented Feb. 24, 1970

3,497,054
BARGE UNLOADING SYSTEM
Jack P. Van Kleunen, 250 S. Franklin Turnpike,
Ramsey, N.J. 07446
Filed Sept. 5, 1967, Ser. No. 672,949
(Filed under Rule 47(b) and 35 U.S.C. 118)
Int. Cl. B65g 65/16, 65/10
U.S. Cl. 198—36                                    2 Claims

ABSTRACT OF THE DISCLOSURE

A large unloading apparatus having means for picking up material and depositing it on a conveyor in combination with a scraper device movable to feed material to the pick-up means when positioned adjacent thereto and also movable into inaccessable places for drawing material into said wheel.

---

This invention relates to an improved barge unloader, and in particular to means for improving the cleaning phase of unloading a barge.

At present, barges are unloaded by a variety of apparatus including grab buckets, bucket chain elevators, and bucket wheel systems, but each of these unloaders requires the use of a Payloader for clean-up.

In each of the known barge unloading systems, a minimum of two passes is required to remove most of the material. That is, about 50% of the accessible material is removed from a barge beginning at one end and proceeding to the opposite end in a first pass. A substantial portion of the remaining accessible material in the barge is removed on the next end to end pass. The inaccessible material (i.e. under hatch covers under the deck of the barge and in corners etc.) is then removed in a clean-up phase. In some instances the barge is moved to another station for "cleaning up."

In the clean-up phase, the grab bucket apparatus, or continuous bucket chain elevator apparatus or the like often scrapes the bottom of the barge hold. This may cause excessive wear and damage to the bottom of the barge. In some cases patches covering previous damage are torn off if the operator does not use extreme care. It will be apparent that cleaning up with a grab bucket and chain elevator bucket apparatus is time consuming, and requires considerable operator skill and experience. Furthermore, very often auxiliary equipment is used during the clean-up phase.

Thus, in practice, whether the unloader is of the grab bucket type, bucket elevator type, or bucket wheel type, it is often preferable to lower a small mobile digger, such as known under the trade name Payloader, into the barge hold. This auxiliary equipment places the inaccessible material in the barge hold out in the open where it can be removed by the unloader. The disadvantages of this clean-up system are apparent. Even though this procedure can minimize barge wear and damage and may not require the operator care and skill necessary to clean-up, with a grab bucket or chain elevator or bucket wheel unloader system the use of auxiliary equipment is required.

According to the instant invention, a barge clean-up device is provided in combination with an unloader which eliminates the problems and disadvantages noted above. The clean-up device according to the invention comprises a scraper or back hoe type apparatus. Preferably a scraper is provided both fore and aft of the unloader. In a preferred form the device is used in association with a bucket wheel unloader. According to the invention, the fore and aft scraper devices can be operated by the bucket wheel operator to pull inaccessible material from under stacked hatch covers, overhanging barge decks, etc. into a position where it can be removed by the bucket wheel.

However, in addition to the advantages of this combination for clean-up, the clean-up device according to the invention is also useful during the passes of the barge beneath the wheel as a feeder for the bucket wheel, that is, the scraper can be placed in a position relative to the bucket wheel so that it will plow or lift material into the path of the buckets of the rotating wheel during the movement of the barge beneath the wheel. The scraper so positioned will create a wave in the material during the movement of the barge. This will allow the operator to keep the wheel above the bottom of the hold while at the same time make it possible for him to remove material immediately adjacent the bottom of the barge. This results when the scraper is positioned on or immediately adjacent the bottom of the barge. Also, the wave facilitates filling of the buckets. The scraper further, according to the invention, is utilized as part of a sensor which functions to automatically maintain clearance between the bottom of the barge hold and the bucket wheel. This is particularly useful to maintain the barge bottom-bucket wheel clearance as the barge rises during removal of the material from within it.

The combination of bucket wheel-scraper or back hoe apparatus therefore provides equipment and advantages for barge unloading which have been unknown heretofore.

An object of the invention is to provide a known bucket wheel barge unloader system with improved material removal capabilities.

Another object of the invention is to provide a bucket wheel with a device for improving the clean-up operation in barge unloading.

Still another object of the invention is to provide a method of unloading a barge by use of an unloader-scraper combination which will promote barge stability.

A further object is to provide a method of operating an unloader-clean-up device combination whereby the bulk material on the bottom of the barge can be formed into a pile or wave so as to facilitate the picking up of the material by the unloader.

A more particular object of the invention is to provide a bucket wheel barge unloader-scraper combination having the advantages noted above as well as a means for automatic sensing, and control, of the position of the bucket wheel relative to a barge.

The foregoing objects and advantages and additional objects and advantages of this invention will become apparent from the following detailed description of a presently preferred embodiment of the invention illustrated in the accompanying drawing in which:

FIG. 3 is an end elevation of the improved bucket wheel for barge unloading systems according to the present invention taken along line III, III of FIG. 5.

FIG. 4 is a side elevational view of the apparatus shown in FIG. 3 of the improved bucket wheel according to the invention.

FIG. 5 is another side elevational view similar to FIG. 4 illustrating different operative positions of the apparatus illustrated.

Figure 1:
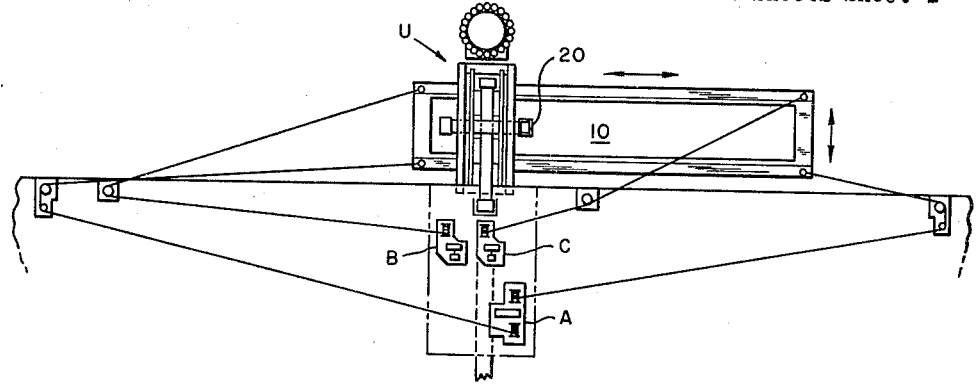
FIG. 1 is a schematic plan view of a barge maneuvering apparatus of a bucket wheel barge unloader system.

As shown in FIG. 1, a barge unloading system as known in the art comprising a plurality of barge maneuvering or haul winches A, B, C, arranged for moving barge 10 back and forth in the unloading station U relative to a bucket wheel unloader 20. The barge 10 is coupled with the barge haul winches by cables and sheaves as shown. The arrows indicate the direction of movement of the barge imparted by operation of the winches, A, B, C. A pair of winches or a dual winch A controls the longitudinal movement of the barge and its rate of passage through the unloading station. The winches B and C direct the barge into the unloading station where a known barge vise (not shown) maintains the transverse position of the barge relative to the station.

The bucket wheel unloader 20 is itself movable athwart, i.e. across, the barge as is known.

Figure 2:
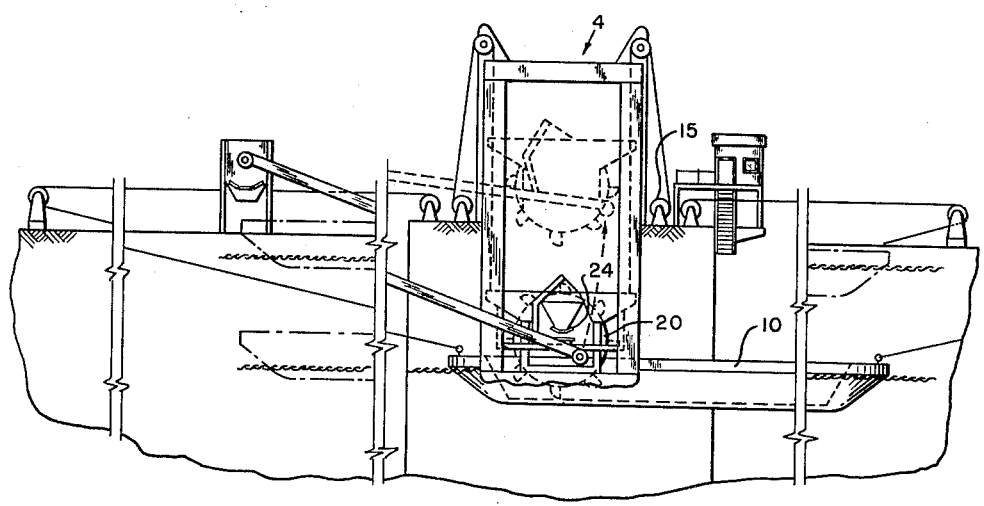
FIG. 2 is an enlarged schematic side elevational view of a bucket wheel barge unloader system as shown in FIG. 1.

Referring to FIG. 2, it will be appreciated that the bucket wheel unloader 20 can be raised and lowered when required to compensate for changes in water elevation, and that the winch system 15, for this purpose, can also be utilized to raise or lower the bucket wheel unloader 20 for the first, second, or successive unloading passes. In addition, according to the invention the winch system 15 is electrically coupled with sensor means connected with the scraper for preventing the bucket wheel from being lowered, onto the bottom of the barge hold or the barge floating up into the bucket wheel as material is being removed, as will be explained fully hereinafter.

As shown in part in FIGS. 3, 4 and 5, the bucket wheel unloader 20, known in the art, preferably comprises a bucket wheel having two rows of buckets 21. The bucket wheel 21 is supported on a carriage 22 for rotation in a clockwise direction. The carriage 22 is movable on the bridge 23 whereby the bucket wheel may be moved back and forth over the bridge. The bucket wheel discharges material onto the bridge conveyor 24 via hoppers (not shown). Prime movers for driving the bucket wheel 20 and moving the carriage 22 on the bridge 23 are provided, as is well known, and they are therefore not described herein. It will be appreciated that the bridge extends athwart a barge 10 in the unloading station U. Therefore both the carriage and bucket wheel can be moved transversely of the barge as the barge is moved (passed) through the unloading station.

It is known that the bucket wheel may be suspended below the bridge member instead of being concentrically located about a bridge approximately on the axis of rotation of the bucket wheel as shown.

The scraper or back-hoe devices, generally designated 30a and 30b, each comprise a scraper blade 31 pivotally connected to a pair of articulate arms. The arms are pivotally secured at one end on carriage 22. The scrapers therefore move with the wheel 21. As seen in FIG. 3, the blade 31 extends the width of the bucket wheel unloader 20. The scraper devices 30 are identical, and each can function either as a leading or trailing scraper as will appear hereinafter.

The movement and positioning of each of the scraper devices is controlled by the operator of the bucket wheel unloader by suitable known means.

During the first pass of the bucket wheel, both scraper devices are placed in the stowed position. In FIGS. 4 and 5, this position is illustrated by the left hand scraper device generally designated 30a. However, it is also contemplated that the trailing scraper device, 30b, can be lowered into the material of the hold to create a wave therein when the barge is moved as indicated in FIG. 4 by numeral 40. This wave will be adjacent to the lower periphery of the bucket wheels and can result in increased efficiency of the bucket wheels by assuring that each bucket is more completely filled.

It is known to have bucket wheel diggers and unloaders of the type shown provided with reversible buckets so that the wheel, while rotating in only one direction, can operate in both a forward and backward direction of movement. Thus, during the second pass when the barge is moving in the opposite direction to that shown in FIG. 4, the buckets can be reversed for the second pass in this reversed direction. However, reversing each bucket of both wheels of the unloader is time consuming, and hauling the barge back to a starting position, when bucket reversing is not possible, is likewise a waste of time. These disadvantages are readily overcome by lowering the scraper device 30a to place the scraper 31 thereof in the position shown in phantom in FIG. 5. Now the barge is moved in a direction opposite to that indicated in FIG. 4. The scraper 31 will create a wave of material which is lifted up into the path of the buckets of the unloader wheel rotating in a clockwise direction. Thus, the scraper device acts as a feeder for the bucket wheel.

As seen in FIG. 4, the trailing scraper 30b (when the barge is moving in the direction of the arrow of this figure) is also utilized as a feeder on the last pass of the unloading operation. At the same time, since it engages the bottom of the barge, it is provided with a sensor 32 which is coupled with the unloader winch system 15 for lifting the bucket wheel. The sensor 32 will be described hereinafter. Thus, the sensor will maintain the scraper in light engagement with the bottom of the hold and at the same time maintain the bucket wheel clearance from the bottom of the hold. As mentioned hereinabove, the sensor of the scraper device engaging the bottom of the barge hold also corrects for increased barge floatation as material is removed by lifting the unloader a distance equal to the variation on the water line on the barge.

In addition to the above described functions of the scraper devices 30 during unloading operations, the clean-up operation is performed by operating the scrapers in a manner similar to a back-hoe machine commonly used in excavation and trenching operations. As seen in FIGS. 4 and 5, the scraper 31 is pivotally attached to the forearm 33. Offset from this pivot is a second pivotal attachment of the scraper with the piston shaft 35 of the hydraulic cylinder 36. By suitable known hydraulic and electric circuit means the scraper device is operable as indicated at the right hand side of FIG. 5. As seen in the drawing, the scraper blade 31 may be fixed in position relative to the forearm 33 and the forearm moved relative to the upper arm 34 by means of the hydraulic linkage designated 37. This linkage is of known construction, in which the piston shaft is connected to one part and the cylinder to the other. The upper arm 34 is hinged on the carriage 22 as shown and pivoted by the hydraulic linkage 38 in the same manner as described in connection with linkage 37.

As shown at the right side of FIG. 5, the upper arm 34 can be lowered under the barge deck or stacked hatch covers and the forearm and blade manipulated to pull material from the inaccessible places and into the path of the bucket wheels.

In FIGS. 4 and 5, the sensor 32 is illustrated as a hydraulic piston and cylinder arrangement which is connected in parallel with the hydraulic linkage 37 used for raising and lowering the upper arm 34. When the scraper is utilized for preventing engagement between the bucket wheel and the bottom of the barge, it is placed in the position indicated at 30b in FIG. 4. The arms 33 and 34 and scraper 31 are locked in this position by the hydraulic linkages 37 and 38. The sensor 32 which is filled with fluid during this maneuver is provided with pressure sensitive devices coupled with a known electric circuit means (not shown). When the barge 10 rises the fluid pressure in the cylinder of sensor 32 will increase. This will generate a signal which is transmitted to a relay, and which causes the winch 15 to raise the bucket wheel until the pressure in the sensor cylinder 32 is lowered to a determined value at which the winch 15 is shut off. The same sensor cylinder 32 can be utilized with the leading scraper 30a as shown at the left in FIGS. 4 and 5.

The cylinder 32 may also be connected with a circuit controlling the barge haul winch A so that if a loading scraper such as 30a engages the stacked hatch covers or deck of the barge, movement of the barge is halted. A back-up sensor 40 of known construction may be attached to the dust hood as a precaution against failure of the sensor 38.

In the above description, the sensing means have not been described in greater detail because a number of different sensing devices suitable for use are commercially available. Various other features or elements are described only briefly since they are encompassed in known engineering principles or conventional apparatus and arrangements in use by those skilled in the art to which the invention pertains.

What is claimed is:

1. An apparatus comprising a bucket wheel barge unloader, means for raising and lowering said unloader, a scraper blade device coupled to said unloader, said device including a pair of articulated arms defining a back-hoe like apparatus and a scraper blade coupled to the outer end of said back-hoe like apparatus, means connected to said arms and said unloader for moving said arms relative said unloader, sensing means connected to said arms sensitive to movement of said arms and connected with said means for raising and lowering said unloader, said sensing means being operable in conjunction with said means for raising and lowering said unloader to maintain a determined distance between said unloader and a barge in material removing position with respect to said unloader.

2. An apparatus comprising a barge unloader, means for raising and lowering said unloader, an articulated scraper device connected to said unloader, said scraper device having a scraper blade mounted at the outer end thereof, means connected to said scraper device and to said unloader for moving said scraper device relative said unloader, sensing means connected to said scraper device which is sensitive to movement of said blade and which is connected with said means for raising and lowering said unloader, said sensing means being operable in conjunction with said means for raising and lowering said unloader whereby the last said means raises said unloader when an upward force on said scraper blade is sensed by said sensing means which exceeds a predetermined level.

References Cited

UNITED STATES PATENTS

| 2,099,981 | 11/1937 | Joy | 198—10 |
| 2,574,118 | 11/1951 | McWilliams | 198—10 XR |
| 2,639,023 | 5/1953 | Goodrich | 198—10 |
| 3,104,766 | 9/1963 | Sasadi | 214—14 |
| 3,307,717 | 3/1967 | Ludwig | 214—14 |

FOREIGN PATENTS 1,120,981 12/1961 Germany.

GERALD M. FORLENZA, Primary Examiner

FRANK E. WERNER, Assistant Examiner

U.S. Cl. X.R.

198—103; 214—14